June 8, 1954
C. RINGWALD
2,680,818
REMOTE THROTTLE CONTROL AND
SPEED INDICATOR FOR ENGINES
Filed July 17, 1952
3 Sheets-Sheet 1
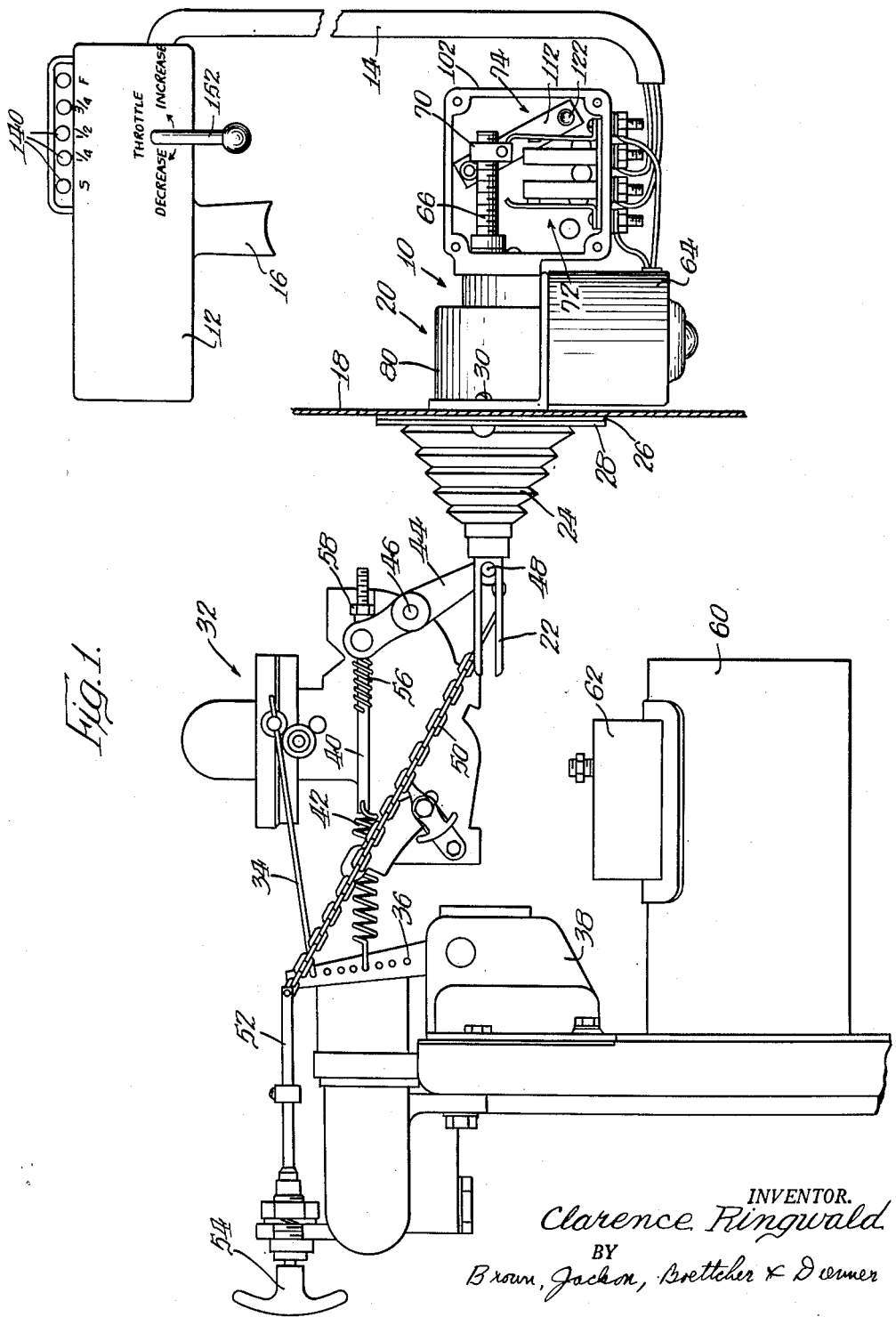
INVENTOR.
Clarence Ringwald
BY
Brown, Jackson, Boettcher & Dienner
Attys.

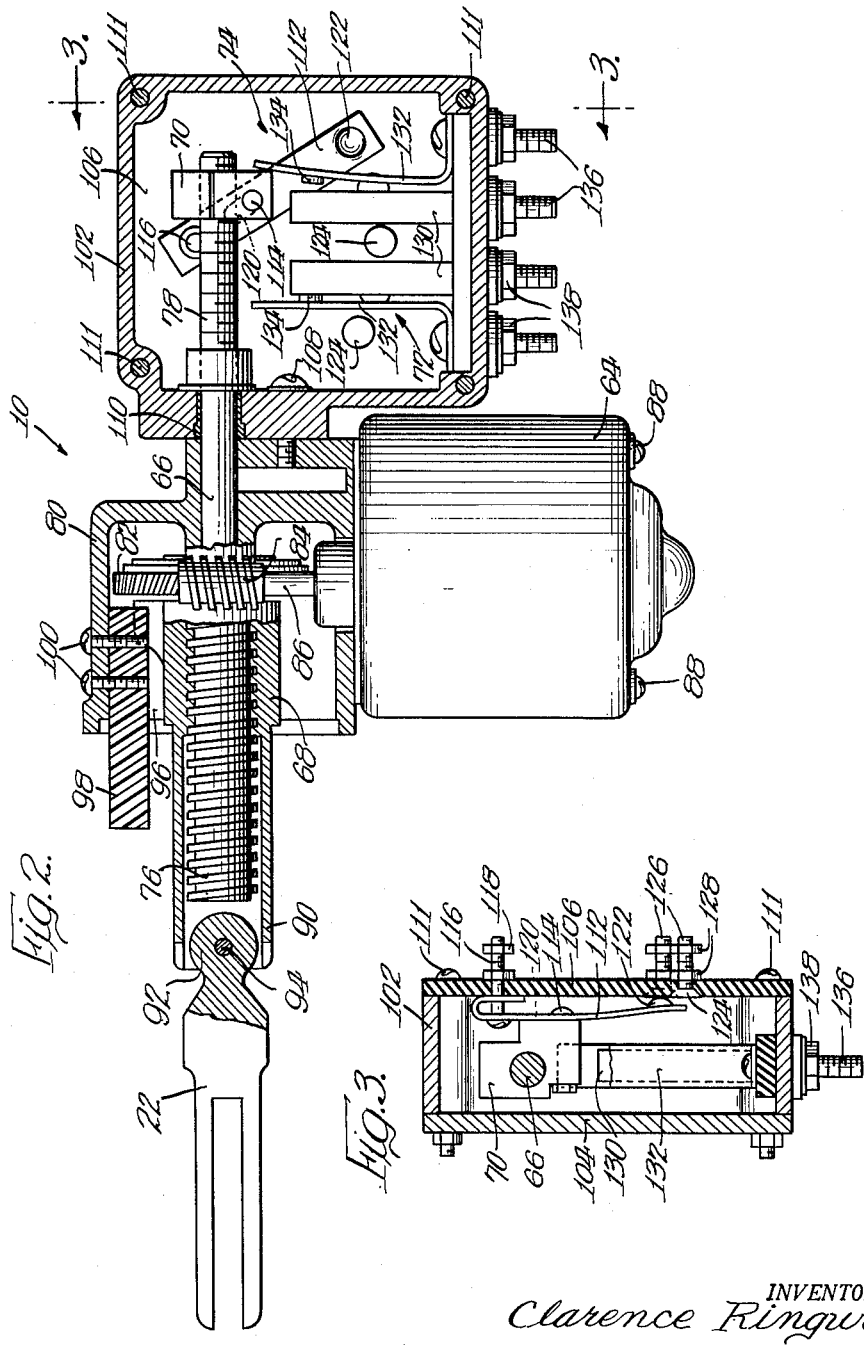

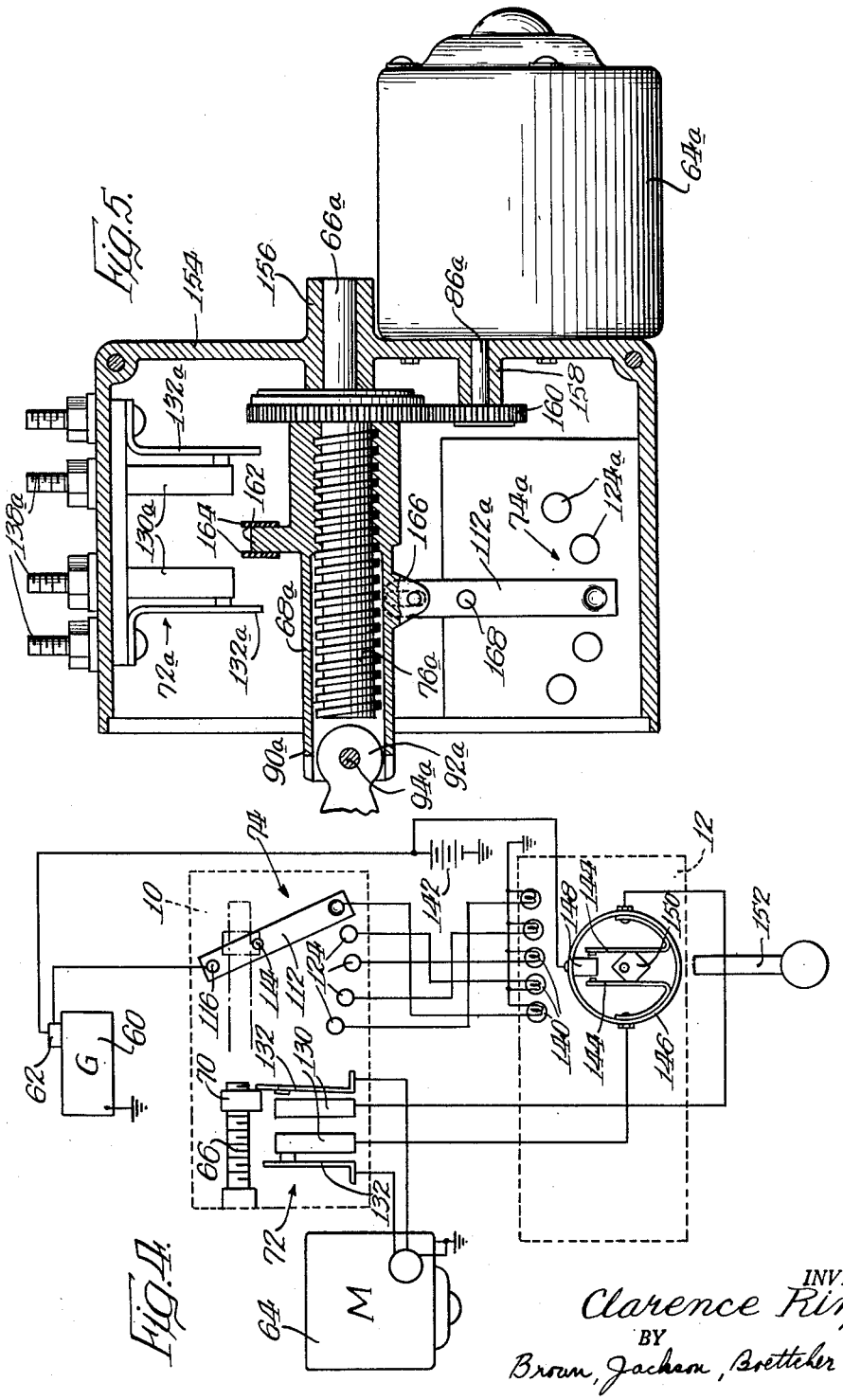

Patented June 8, 1954

2,680,818

UNITED STATES PATENT OFFICE 2,680,818

REMOTE THROTTLE CONTROL AND SPEED INDICATOR FOR ENGINES

Clarence Ringwald, Springfield, Ohio

Application July 17, 1952, Serial No. 299,479

10 Claims. (Cl. 290—40)

The present invention relates to remote control means for engines and, particularly, to remotely located throttle controls and engine speed indicators for internal-combustion engines.

While the present invention has applicability to all engine installations wherein it is desired to control the engine from a remote location, the invention has particular application to sleet and snow control trucks for spreading sand and rock salt on streets. In such trucks, the sand or salt spreader is mounted at the rear of the truck and is operated by an internal-combustion engine. Heretofore, it has been practically essential to station an operator at the spreader engine to control the distance or degree of spreading by proper engine adjustment. This requires two men to a truck, a driver and a spreader engine operator. While endeavors have been made to eliminate the necessity for a spreader engine operator, the same have proven unsatisfactory for the reason that the truck driver has been required to stop frequently to determine whether or not the spreader engine is operating, if so at what speed, and to make necessary engine control adjustments.

It is an object of the present invention to provide means whereby control of an engine, such as a sand spreader engine, may be accomplished from a remote location, such as a truck cab, and whereby the speed of engine operation and results of controls effected are indicated from the same remote location, thus eliminating the necessity for a special engine operator and/or for frequent close-up inspection and control.

Another object of the invention is to provide combined means for controlling engine throttle setting from a remote location and for indicating throttle setting at that location so long as the engine is operating.

A further object of the invention is the provision of a novel combination of electrical means for controlling engine throttle setting, electrically illuminated means for indicating throttle setting and electrical circuit means for maintaining illumination of the indicating means only so long as the engine is operating properly.

A still further object of the invention is the provision of a novel remote control combination, for use with an internal-combustion engine having a battery, a generator for charging the battery and a relay or relay-regulator for controlling charging of the battery, of electrical means for controlling engine throttle setting, electrically illuminated means for indicating throttle setting, and electrical circuit means, including switching apparatus and the generator relay or relay-regulator, for controlling the throttle setting means and for energizing the indicating means so long as the engine is operating properly.

Other objects and advantages of the present invention will become apparent in the following detailed description of a preferred embodiment of the invention, wherein reference is made to the accompanying drawings, in which:

Figure 1 is a view showing, in side elevation, the pertinent portions of an internal combustion engine and the engine associated portion of the control and indicating means of the present invention and, in plan, the control and indicating panel of said means;

Figure 2 is a longitudinal vertical section of the engine associated apparatus of the present invention;

Figure 3 is a cross-sectional view of the apparatus shown in Figure 2, the view being taken substantially on line 3—3 of Figure 2;

Figure 4 is a diagram of the novel circuit arrangement provided by the present invention; and Figure 5 is a view similar to Figure 2 of a second embodiment of the engine associated apparatus of the control and indicating means of the present invention.

Referring now to the drawings, I have shown, in Figure 1, the manner in which the control apparatus of my invention is associated with an internal-combustion engine. The apparatus consists of a motor associated assembly 10, a control assembly or control panel 12 adapted to be located remotely of the engine, and suitable electrical connectors or leads between the assemblies 10 and 12, some of which leads are indicated by the electrical conductor cord 14.

The control panel 12 preferably comprises a generally box-like container adapted for the reception of control and indicating means as will be described hereinafter. The panel may be formed as desired, but for sleet control trucks and like installations, as referred to hereinbefore, it is preferred that the same include a stem 16 or the like by means of which the control panel may be secured to the steering column in the truck cab so as to be disposed for ready access and visibility by the truck driver.

The engine associated apparatus of the control and indicating means of the present invention is adapted to be mounted on the fire wall 18 of the engine. To receive the apparatus 10, the fire wall 18 is provided with an aperture therein through which a portion of the apparatus 10 extends. Generally, the engine associated apparatus 10 of the control means of the present invention includes a body or main portion 20 mounted to the exterior of the engine fire wall 18, a throttle actuating fork 22 and a resilient bellows type sealing member, the latter two portions of the assembly being mounted to the engine side of the fire wall. The bellows 24 is sealed to the fork 22 at its forward end and at the end thereof adjacent the fire wall includes a flange 26 adapted to be confined between a sealing ring or annular sealing plate 28 and the inner surface of the fire wall 18. The end face of the body portion 20 of the assembly 10 abuts against the opposite or exterior side of the fire wall 18 and suitable fasteners or screws 30 are passed through a flange of the body portion 20, through the fire wall 18 and the flange 26 of the sealing member 24 and are threaded to the annular plate 28 to secure the apparatus 10 to the fire wall 18.

As shown in Figure 1, the internal-combustion engine includes a carburetor 32 having a throttle rod 34 and a throttle actuating lever 36 which is controlled by means of a governor 38. To control throttle setting through the medium of the governor, a throttle setting rod 40 is connected by means of a spring 42 to the governor lever 36. The rod 40 is adjustably connected to a lever 44 which is pivotally mounted intermediate its ends at a fixed point 46 and includes a roller 48 at its free outer end adapted to be received within the slot of the fork 22. To provide for manual actuation of the throttle, a chain 50 is connected at one end to the lower end of the lever 44 and at its other end to a manually operated rod or member 52 mounted for movement on the engine and terminating exteriorly of the engine in a handle 54. As will be appreciated, the engagement between the lever 44, the chain 50 and the fork 22 is such that when the fork 22 is adjusted as shown in Figure 1 to zero throttle position, throttle setting may be manually accomplished through full throttle range by manipulation of the handle 54. An outward pull exerted on the handle 54 will exert a throttle opening force on the governor lever 36 through the spring 42. Upon release of the handle 54, the throttle is closed by the normal bias of the governor 38. Accordingly, as will be appreciated, the fork 22 provides a one-way driving connection between the apparatus of the present invention and the throttle actuating apparatus of the engine. To adjust and calibrate throttle setting, the governor lever 36 is provided with a plurality of holes adapted for the adjustable reception of the spring 42 and the rod 40 is adjustable with respect to the lever 44 by means of a spring 56 mounted on the rod 40 to one side of the lever 44 and a nut 58 threaded on the rod 40 to the other side of the lever 44. As shown, the engine also includes a generator 60 and a relay or relay-regulator 62 for the generator 60.

Referring now to Figure 2, the engine associated apparatus 10 of the device of the present invention is shown in detail. Briefly, the apparatus includes an electric motor 64 for operating a driving screw 66, nut means in the form of a pair of nuts 68 and 70 mounted on the screw 66 and held against rotation therewith, the fork 22 which is carried by the nut means, a limit switch 72 and an indicator switch 74, both switches being adapted for operation by the nut means. The driving member 66 is threaded at each end thereof, as at 76 and 78, and is journalled intermediate its ends in a gear housing 80 which is preferably formed of cast metal. The threads of the screws 66 each have a low pitch and the one, 76, at the forward end of the screw, for driving the fork 22, is preferably a square thread while the one, 78, at the rearward end of the screw, for driving the switch actuating nut 70, is preferably a conventional machine screw thread. Adjacent the inner end of the threaded portion 76 of the screw 66, a gear 82 is secured to the screw 66 within the gear housing 80, which gear is adapted to mesh with a worm 84 secured to the shaft 86 of the motor 64. The motor 64 comprises a reversible electric motor secured to the gear housing 80 by means of suitable studs 88 extending through the motor housing and stator laminations and threaded into the housing 80.

The fork actuating nut 68 comprises an elongate tubular member having a stepped bore with the portion of reduced diameter thereof disposed at the inner end. The portion of reduced diameter is provided with a thread mating with the square thread 76 and the remainder the nut 68 freely encircles the threaded portion 76 of the screw 66 and terminates in a socket 90 within which a ball end portion 92 of the fork 22 is pivotally mounted for movement in a vertical plane by means of a pivot pin 94. Adjacent the inner end thereof, the nut 68 is provided at the upper side thereof with a generally U-shaped portion including a pair of spaced legs 96. To restrain the nut 68 against rotation with the screw 66, a block 98, preferably of self-lubricating insulating material, projects between the legs 96 of the U-shaped portion of the nut and is secured to the housing 80 by means of suitable screws or the like 100. In operation, upon rotation of the screw 66 by the motor 64, the block 98 retains the nut 68 against rotation so that the nut 68 is advanced or retracted axially of the screw 66, longitudinally of the housing 80 and the block 98, to vary the position of the fork 22 to open and close the throttle.

The limit switch 72 and the indicator switch 74 are preferably mounted in a common housing 102 which comprises a rectangular metallic box having open sides adapted to be closed by means of a metallic plate 104 and a plate 106 of insulating material, respectively. The switch housing 102 is secured to the gear housing 80 by means of a bolt 108 and is provided with an aperture adapted for the passage of the screw 66. A bearing 110 is disposed within the aperture provided in the switch housing to rotatably support the screw 66. The side plates 104 and 106 are secured to the switch housing 102 by means of suitable bolts or the like 111. Within the housing 102, the switch actuating nut 70 has threaded association with the machine screw threaded portion 78 of the screw 66. The nut 70 is held against rotation with the screw 66 by means of a switch blade 112, forming a part of the indicator switch 74, and to which the nut 70 is connected by means of a bolt 114. The switch blade 112 is pivotally mounted on the insulating wall 106 of the switch housing 102 by means of a bolt 116 comprising a terminal for the blade. A nut 118 is threaded to the bolt 116 to secure a lead to the terminal 116. To accommodate passage of the bolt 114 and to accommodate swinging movement of the switch blade 112 on its pivotal support 116 in response to movement of the nut 70, the switch blade 112 is provided with a slot 120. At its lower end, the switch blade 112 terminates in a raised portion or contact 122 adapted to engage a series of stationary contacts 124 mounted in the insulating wall 106 of the switch housing. The stationary contacts 124 each preferably comprise a bolt 126 and a pair of nuts 128 adapted to secure the bolt 126 to the wall 106 and to connect an electrical lead to the terminal formed by the bolt.

Upon actuation of the screw 66 by the motor 64, the threaded portion 78 of the screw 66 causes movement of the nut 70 along the screw 66 thus causing the switch blade 112 to move over the contacts 124. The switch blade 112 and the stationary contacts 124 comprise the indicator switch 74, as will become apparent hereinafter, and the insulator wall 106 provides an insulating support for all of the terminals of the indicator switch.

The limit switch 72 comprises a pair of stationary bars 130 formed of highly conductive metal and a pair of resilient switch blades 132 each carrying a contact 134 adapted for switching engagement and disengagement with respect to the stationary bars 130. The switch blades 132 are normally biased due to their own resiliency into engagement with the respective bar 130 and each include an upwardly extending portion projecting into the path of movement of the nut 70 adapted for engagement thereby to break electrical circuit means at opposite limits of travel of the nut means 68 and 70. Each of the bars 130 and switch blades 132 is provided with a terminal bolt 136 and a nut 138 for attachment of leads from a power circuit to the motor. The terminal bolts 136 and nuts 138 are provided with conventional insulating mountings in the bottom wall of the metallic switch housing 102.

Referring now to Figure 4, the manner in which the apparatus of the present invention is connected in circuit is shown. The indicator switch 74 has each stationary contact 124 thereof connected to one of a plurality of light bulbs 140, the number of bulbs being the same as the number of contacts. For example, five stationary contacts 124 have been shown in which case five light bulbs 140 are provided which may suitably indicate stop, one-quarter, one-half, three-quarter and full speed throttle settings, respectively, as is indicated in Figure 1. Each of the light bulbs 140 has a connection to ground, as is shown. The switch blade 112 of the indicator switch 74 is electrically connected to the generator relay or relay-regulator 62 which is connected to the engine battery 144. As is conventional, the generator and battery are grounded. The relay or relay-regulator 62 comprises a cut-out relay for the generator to avoid battery discharge to the generator when the generator is running below charging speed. Thus, if the generator is running properly, one of the bulbs 140 will be energized depending upon which one of the contacts 124 is engaged by the switch blade 112. However, if the engine stops, the relay 62 cuts out to de-energize the bulbs 140 thus indicating to the observer remotely of the engine that the engine has stopped. If the engine slows down, the light of the illuminated bulb fades out, thus indicating to the observer improper engine operation. Accordingly, the indicator provides a visual indication of motor performance.

The actuating motor 64 of the apparatus of the present invention has connection to the switch blades 132 of the limit switch and the bars 130 of the limit switch are connected to separate terminals and resilient switch blades 144 of a manually operable two-way control switch 146, which is mounted in the control panel 12. The switch 146 includes a stationary contact 148 directly connected to the battery 142, and the motor 64 is grounded. To actuate the switch 146, a cam 150 is provided operable by means of a handle or lever 152 (see Figure 1) for accommodating engagement of either of the movable switch blades 144 with the stationary contact 148. For example, referring to Figure 4, the switches 72 and 74 are shown in stop position wherein one of the limit switches is opened to break the motor circuit. To open, or to increase the opening of, the throttle setting, the handle 152 is moved to the right whereupon the cam 150, which comprises an eccentrically mounted octagonal block of insulating material, will move the right hand contact further away from the stationary contact 148 of the switch 146 and will accommodate movement of the left hand spring metal contact blade 144 into engagement with the stationary contact 148 to close the motor circuit through the left hand limit switch unit. Due to its configuration, the cam 150 is locked in position so that the operator may release the handle or lever 152 until the desired throttle setting is attained. As the electric motor 64 is operated, the screw 66 is rotated to move the nuts 68 and 70 therealong. As the nut 68 moves outwardly of the gear housing 80, the fork 22 advances the lever 44 to impose a load through the rod 40 and the spring 42 on the governor lever 36 to open the throttle. The control panel 12 of the device of the present invention may suitably include a remotely located starter for the engine and a remotely located clutch operating means for engaging the engine crankshaft with the apparatus to be actuated by the engine. When the engine is started, the generator 60 is operated until the same reaches such speed as to have a battery charging current output, at which time the relay 62 closes to connect the generator and the battery and thus to allow or accommodate a current flow from the battery to the indicating bulbs 140 on the control panel 12. Depending upon the position of the movable switch blade 112, one of the bulbs will be illuminated to indicate the engine throttle setting, that is, to indicate the setting of the throttle actuating fork 22. If it is desired to open the throttle to its full open position, the lever 152 on the control panel 12 need merely be set to the right and left in that position. When the throttle reaches its full open position, the nut 70 is set to engage the switch blade 132 of the left hand limit switch unit to break the circuit to the motor 64 to stop the motor. At this time, the switch blade 112 will be moved to the left hand stationary contact 124 so as to close the circuit to the bulb illuminating the full indication on the control panel. To operate the throttle control to decrease throttle opening, the control lever 152 is moved to the left to accomplish reverse operation of the motor to retract the throttle actuating member or fork 22. At positions of throttle opening wherein the nut 70 lies intermediate the switch blades 132 of the limit switch, it will be appreciated that the device may be operated in either direction to increase or decrease throttle opening since both limit switches will be closed.

From the foregoing, it will be appreciated that the present invention provides means for controlling the engine throttle accurately from a remote location and for indicating the throttle setting at that location. The utilization of the device does not interfere with or impair the function of the engine governor. Due to the circuit arrangements provided by the present invention, an accurate indication of engine operation is provided due to the illumination of the bulbs 140 and to the dimming out and blacking out thereof when the engine operates improperly.

A modified embodiment of the engine associated portion of the apparatus of the present invention is shown in Figure 5 wherein the apparatus is very similar to the apparatus previously described. Accordingly, like reference numerals with the suffix "a" have been applied to like parts, different parts being indicated by newly applied reference numerals. In the modified embodiment of the present invention, one object is to provide a single threaded driven means or nut for actuating both the throttle and the switches and another object is to provide a single housing for the switches and the gears. To this end, a combined gear and switch housing 154 is provided having a bearing portion 156 for rotatably supporting the screw 66a and a bearing portion 158 for rotatably supporting the shaft 86a of the motor 64a. The shaft 86a of the motor 64a carries a gear 160 which meshes with the gear 82a provided on the screw 66a. The nut 68a is the same as the nut 68 previously described with the exception that the legs 96 have been omitted and an abutment 162 is provided on the top of the screw for actuating the limit switch 72 which is disposed above the screw 66a. To prevent short circuiting, strips of insulating material 164 are mounted on opposite sides of the abutment 162 for effecting actuation of the switch blades 132a of the limit switch 72a. At its lower side, the nut 68a is provided with a pair of spaced legs 166 adapted for the reception and pivotal support therebetween of one end of the switch blade 112a of the indicator switch 74a which is provided with a fixed pivot 168 within the housing 154. It is believed that the operation and use of the embodiment of the invention shown in Figure 5 will be entirely clear from the description hereinbefore relating to the embodiment of the invention shown in Figure 2.

From the foregoing, it will be appreciated that the present invention provides a remote throttle control and speed indicating device for internal combustion engines comprising a reversible electric motor drive, a driving threaded member, a driven threaded member or means, limit switch means responsive to movement of the driven means to break the motor circuit at predetermined points of driven means movement, and indicator switch means responsive to movement of the driven means for making and breaking the circuit to a plurality of illuminated indicator means energized from the engine battery through the engine generator relay. As will be appreciated, the remote control and indicating means of the present invention provides for the complete control of engine throttle setting from a point located remotely of the engine and at that location provides a visual indication of the manner in which the engine is performing in response to controls effected.

In many instances, as pointed out hereinbefore, the utilization of the remote control means of the present invention will result in labor saving economies. In addition, it will be appreciated that the present invention provides throttle controls and speed indicators for internal-combustion engines that are compact in structure, economical of manufacture and assembly and highly efficient in use.

In the specific example of the use to which the apparatus of the present invention may be put, as pointed out hereinbefore, the truck driver can operate and control the sand spreader engine from the truck cab and is provided in the truck cab with a visual indication of engine performance. Another similar use of the apparatus of the present invention is for the remote control of an engine for driving the compressor of refrigerated truck transports and the like. It will be appreciated, however, that the remote control means of the present invention is not limited to truck applications and has many uses other than those pointed out.

While I have described what I regard to be a preferred embodiment of my invention, it will be appreciated that various changes, rearrangements and modifications may be made therein without departing from the scope of the invention, as defined by the appended claims.

I claim:

1. A remote throttle control and speed indicator for internal-combustion engines having a battery, a generator for charging the battery and a relay for disconnecting the battery and the generator when the generator fails to produce a battery charging current, comprising, in combination, a rotatable driving screw, a reversible electric motor adapted to be connected to the battery for driving said screw, nut means having threaded association with said screw to be driven thereby, means for holding said nut means against rotation with said screw but accommodating movement of said nut means axially of said screw, a throttle actuating member operatively associated with said nut means, a limit switch in circuit with said motor between said motor and the battery and responsive to movement of said nut means for breaking the motor circuit at the opposite limits of movement of said nut means, a manually operable two-way switch connected in circuit with said limit switch and said motor between said limit switch and the battery for connecting said motor in circuit for operation in opposite directions, an indicator switch including a plurality of stationary contacts and a movable switch blade responsive to movement of said nut means, said blade being adapted to have electrical connection to the generator relay, and electrically illuminated light bulbs connected in circuit with said indicator switch for indicating the setting of said throttle actuating member, said manually operable switch and said light bulbs being adapted to be disposed remotely of the engine.

2. A remote throttle control and speed indicator for internal-combustion engines having a battery, a generator for charging the battery and a relay for disconnecting the battery and the generator when the generator fails to produce a battery charging current, comprising, in combination, rotatable driving threaded means, a reversible electric motor adapted to be connected in circuit with the battery for driving said driving means, threaded driven means having threaded association with said driving means to be driven thereby, means for holding said driving and driven means against rotation together but accommodating movement of one of said means axially thereof, an engine throttle actuating member operatively associated with said one of said means and adapted to be operatively associated with the engine throttle control, a limit switch responsive to movement of said one of said means connected in circuit with said motor between said motor and the battery, a manually operable switch connected in circuit with said motor and said limit switch between said limit switch and the battery, an indicator switch responsive to movement of said one of said means adapted to be connected in circuit with the generator relay, and electrically illuminated means connected in circuit with said indicator switch for indicating the setting of said throttle actuating member, said manually operable switch and said electrically illuminated means being adapted to be disposed remotely of the engine.

3. A remote throttle control and speed indicator for internal-combustion engines having a battery, a generator for charging the battery and a relay for disconnecting the battery and the generator when the generator fails to produce a battery charging current, comprising, in combination, a rotatable driving threaded member, a reversible electric motor adapted to be connected in circuit with the battery for driving said member, threaded driven means having threaded association with said member to be driven thereby, means for holding said driven means against rotation with said driving member but accommodating movement of said driven means axially of said driving member, an engine throttle actuating member operatively associated with said driven means and adapted to be operatively associated with the engine throttle control, a limit switch responsive to movement of said driven means connected in circuit with said motor between said motor and the battery, a manually operable switch connected in circuit with said motor and said limit switch between said limit switch and the battery, an indicator switch including a plurality of stationary contacts and a movable switch blade, said blade being responsive to movement of said driven means and adapted to be connected in circuit with the generator relay, and a plurality of light bulbs each connected in circuit with one of the stationary contacts of said indicator switch for indicating the setting of said throttle actuating member, said manually operable switch and said light bulbs being adapted to be disposed remotely of the engine.

4. A remote throttle control and speed indicator for internal-combustion engines having a throttle, a governor controlling the throttle, a linkage for actuating the governor, a battery, a generator for charging the battery and a relay for disconnecting the battery and the generator when the generator fails to produce a battery charging current, comprising, in combination, a rotatable driving screw, a reversible electric motor adapted to be connected in circuit with the battery for driving said screw, nut means having threaded association with said screw to be driven thereby, means for holding said nut means against rotation with said screw but accommodating movement of said nut means axially of said screw, an engine throttle actuating member operatively associated with said nut means and adapted to be operatively associated with the engine governor linkage, a limit switch responsive to movement of said nut means connected in circuit with said motor between said motor and the battery, a manually operable switch connected in circuit with said motor and said limit switch between said limit switch and the battery, an indicator switch responsive to movement of said nut means adapted to be connected in circuit with the generator relay, and electrically illuminated means connected in circuit with said indicator switch for indicating the setting of said throttle actuating member, said manually operable switch and said electrically illuminated means being adapted to be disposed remotely of the engine.

5. A remote throttle control and speed indicator for internal-combustion engines comprising a housing, a rotatable screw journalled in said housing, a reversible electric motor mounted on said housing for driving said screw in opposite directions, nut means having threaded association with said screw in said housing and including a portion extending exteriorly of said housing, an engine throttle actuating member connected to said portion of said nut means, a limit switch mounted in said housing for actuation by said nut means, said limit switch being connected in circuit with said motor, a manually operable switch connected in circuit with said limit switch and said motor, an indicator switch mounted in said housing including a movable switch blade connected to said nut means for actuation thereby, and electrically illuminated means connected in circuit with said indicator switch for indicating the setting of said throttle actuating member, said manually operable switch and said electrically illuminated means being adapted to be disposed remotely of the engine.

6. A remote throttle control and speed indicator for internal-combustion engines having a throttle, a governor controlling the throttle, a spring biased linkage for operating the governor, a battery, a generator for charging the battery and a relay for disconnecting the battery and the generator when the generator output falls below battery charging current, comprising, in combination, a housing, a rotatable screw journalled in said housing, a reversible electric motor mounted on said housing and adapted to be connected to the battery for driving said screw in opposite directions, nut means having threaded association with said screw in said housing including a portion extending exteriorly of said housing, an engine throttle actuating member connected to said portion of said nut means and adapted to have one-way driving connection with the governor linkage, a limit switch mounted in said housing for actuation by said nut means, said limit switch being connected in circuit with said motor, a manually operable two-way switch connected in circuit with said limit switch and said motor, an indicator switch mounted in said housing including a movable switch blade connected to said nut means for actuation thereby, said switch blade being adapted to be connected to the generator relay, and electrically illuminated means connected in circuit with said indicator switch for indicating the setting of said throttle actuating member, said manually operable switch and said electrically illuminated means being adapted to be disposed remotely of the engine.

7. A remote throttle control and speed indicator for internal-combustion engines comprising, in combination, a housing, a rotatable screw journalled in said housing, a reversible electric motor mounted on said housing for driving said screw in opposite directions, a nut having threaded association with said screw in said housing and including a portion extending exteriorly of said housing, an engine throttle actuating member connected to said portion of said nut, a limit switch mounted in said housing and including a pair of spaced contacts arranged to be actuated by said nut, said limit switch being connected in circuit with said motor, a manually operable two-way switch connected in circuit with said limit switch and said motor, an indicator switch mounted in said housing and including a movable switch blade connected to said nut for actuation thereby and a plurality of stationary contacts adapted to be selectively engaged by said blade, said switch blade holding said nut against rotation with said screw but accommodating movement of said nut axially of said screw, and a plurality of light bulbs each connected in circuit with one of the stationary contacts of said indicator switch for indicating the setting of said throttle actuating member, said manually operable switch and said light bulbs being adapted to be disposed remotely of the engine.

8. A remote throttle control and speed indicator for internal-combustion engines, comprising, in combination, a gear housing, a rotatable screw journalled in said gear housing, a reversible electric motor mounted on said housing for driving said screw in opposite directions, a first nut having threaded association with said screw in said gear housing and including a portion extending exteriorly of said gear housing, means connected to said gear housing for holding said first nut against rotation with said screw but accommodating movement of said first nut axially of said screw, an engine throttle actuating member connected to said portion of said first nut, a switch housing connected to said gear housing, said screw including a portion extending into said switch housing, a second nut having threaded association with said screw in said switch housing, a limit switch mounted in said switch housing and including a pair of stationary contacts arranged to be actuated by said second nut, said limit switch being connected in circuit with said motor, a manually operable two-way switch connected in circuit with said limit switch and said motor, an indicator switch mounted in said switch housing and including a movable switch blade connected to said second nut for actuation thereby and a plurality of stationary contacts adapted to be selectively engaged by said blade, said switch blade holding said second nut against rotation with said screw but accommodating movement of said second nut axially of said screw, and a plurality of light bulbs each connected in circuit with one of the stationary contacts of said indicator switch for indicating the setting of said throttle actuating member, said manually operable switch and said light bulbs being adapted to be disposed remotely of the engine.

9. A remote throttle control and speed indicator for internal-combustion engines having a throttle, a governor controlling the throttle, a spring biased linkage for operating the governor, a battery, a generator for charging the battery and a relay for disconnecting the battery and the generator when the generator output falls below battery charging current, comprising, in combination, a housing, a rotatable screw journalled in said housing, a reversible electric motor mounted on said housing and adapted to be connected to the battery for driving said screw in opposite directions, a nut having threaded association with said screw in said housing and including a portion extending exteriorly of said housing, an engine throttle actuating member connected to said portion of said nut and adapted to have driving connection with the governor linkage, a limit switch mounted in said housing and including a pair of spaced contacts arranged to be actuated by said nut, said limit switch being connected in circuit with said motor, a manually operable two-way switch connected in circuit with said limit switch and said motor, an indicator switch mounted in said housing and including a movable switch blade connected to said nut for actuation thereby and a plurality of stationary contacts adapted to be selectively engaged by said blade, said switch blade being adapted to be connected to the generator relay, said switch blade holding said nut against rotation with said screw but accommodating movement of said nut axially of said screw, and a plurality of light bulbs each connected in series with one of the stationary contacts of said indicator switch for indicating the setting of said throttle actuating member, said manually operable switch and said light bulbs being adapted to be disposed remotely of the engine.

10. A remote throttle control and speed indicator for internal-combustion engines having a throttle, a governor controlling the throttle, a spring biased linkage for operating the governor, a battery, a generator for charging the battery and a relay for disconnecting the battery and the generator when the generator output falls below battery charging current, comprising, in combination, a gear housing, a rotatable screw journalled in said gear housing, a reversible electric motor mounted in said housing and adapted to be connected to the battery for driving said screw in opposite directions, a first nut having threaded association with said screw in said gear housing and including a portion exteriorly of said housing, means connected to said gear housing for holding said first nut against rotation with said screw but accommodating movement of said first nut axially of said screw, an engine throttle actuating member connected to said portion of said first nut and adapted to have driving connection with the governor linkage, a switch housing connected to said gear housing, said screw including a portion extending into said switch housing, a second nut having threaded association with said screw in said switch housing, a limit switch mounted in said switch housing and including a pair of spaced contacts arranged to be actuated by said second nut, said limit switch being connected in circuit with said motor, a manually operable two-way switch connected in circuit with said limit switch and said motor, an indicator switch mounted in said switch housing and including a movable switch blade connected to said second nut for actuation thereby and a plurality of stationary contacts adapted to be selectively engaged by said blade, said switch blade being adapted to be connected to the generator relay, said switch blade holding said second nut against rotation with said screw but accommodating movement of said second nut axially of said screw, and a plurality of light bulbs each connected in series with one of the stationary contacts of said indicator switch for indicating the setting of said throttle actuating member, said manually operable switch and said light bulbs being adapted to be disposed remotely of the engine.

References Cited in the file of this patent

UNITED STATES PATENTS

| Number | Name | Date |
|---|---|---|
| 2,347,523 | Suksdorf | Apr. 25, 1944 |
| 2,375,422 | Leland | May 8, 1945 |
| 2,499,166 | Russell | Feb. 28, 1950 |